(12) United States Patent
Chou et al.

(10) Patent No.: US 8,286,922 B2
(45) Date of Patent: Oct. 16, 2012

(54) CARRIER FOR DATA STORAGE DEVICE

(75) Inventors: Chia-Shin Chou, Taipei Hsien (TW);
Zhen-Xing Ye, Shenzhen (CN);
Zi-Xuan Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 251 days.

(21) Appl. No.: 12/780,921

(22) Filed: May 16, 2010

(65) Prior Publication Data

US 2011/0233352 A1 Sep. 29, 2011

(30) Foreign Application Priority Data

Mar. 26, 2010 (CN) .......................... 2010 1 0133610

(51) Int. Cl.
*G12B 9/00* (2006.01)
(52) U.S. Cl. .................... 248/27.1; 248/201; 361/679.02
(58) Field of Classification Search ............... 312/223.2, 312/298, 301, 303; 248/201, 27.1; 211/85.15; 361/796, 797, 679, 695, 608, 607, 679.39
See application file for complete search history.

(56) References Cited

U.S. PATENT DOCUMENTS

| | | | | |
|---|---|---|---|---|
| 4,097,002 | A * | 6/1978 | Krueger | 242/596.1 |
| 6,597,577 | B1 * | 7/2003 | Tang et al. | 361/724 |
| 2007/0274040 | A1 * | 11/2007 | Chen | 361/695 |
| 2009/0224115 | A1 * | 9/2009 | Zhang et al. | 248/201 |

* cited by examiner

*Primary Examiner* — Teri P. Luu
*Assistant Examiner* — Erin W Smith
(74) *Attorney, Agent, or Firm* — Altis Law Group, Inc.

(57) ABSTRACT

A carrier includes a main bracket. The main bracket includes a first mounting member and a second mounting member. The first mounting member includes a first sidewall and a first front wall. The second mounting member includes a second sidewall and a second front wall. The first front wall is telescopically extensible relative to the second front wall. A retaining width between the first sidewall and the second sidewall is adjustable in order to couple to various size data storage devices.

17 Claims, 5 Drawing Sheets

CARRIER FOR DATA STORAGE DEVICE

BACKGROUND

1. Technical Field

The present disclosure relates to carriers, especially to a carrier for a data storage device.

2. Description of Related Art

Conventionally, hard disk drives (HDDs) are simply mounted into a computer. This mounting means can be complex, difficult, and substantially wastes time. Also, some HDDs are mounted to a computer using a disk drive tray. When employing different forms of HDDs in one computer, the different HDDs must be mounted to the computer with different sized disk trays.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
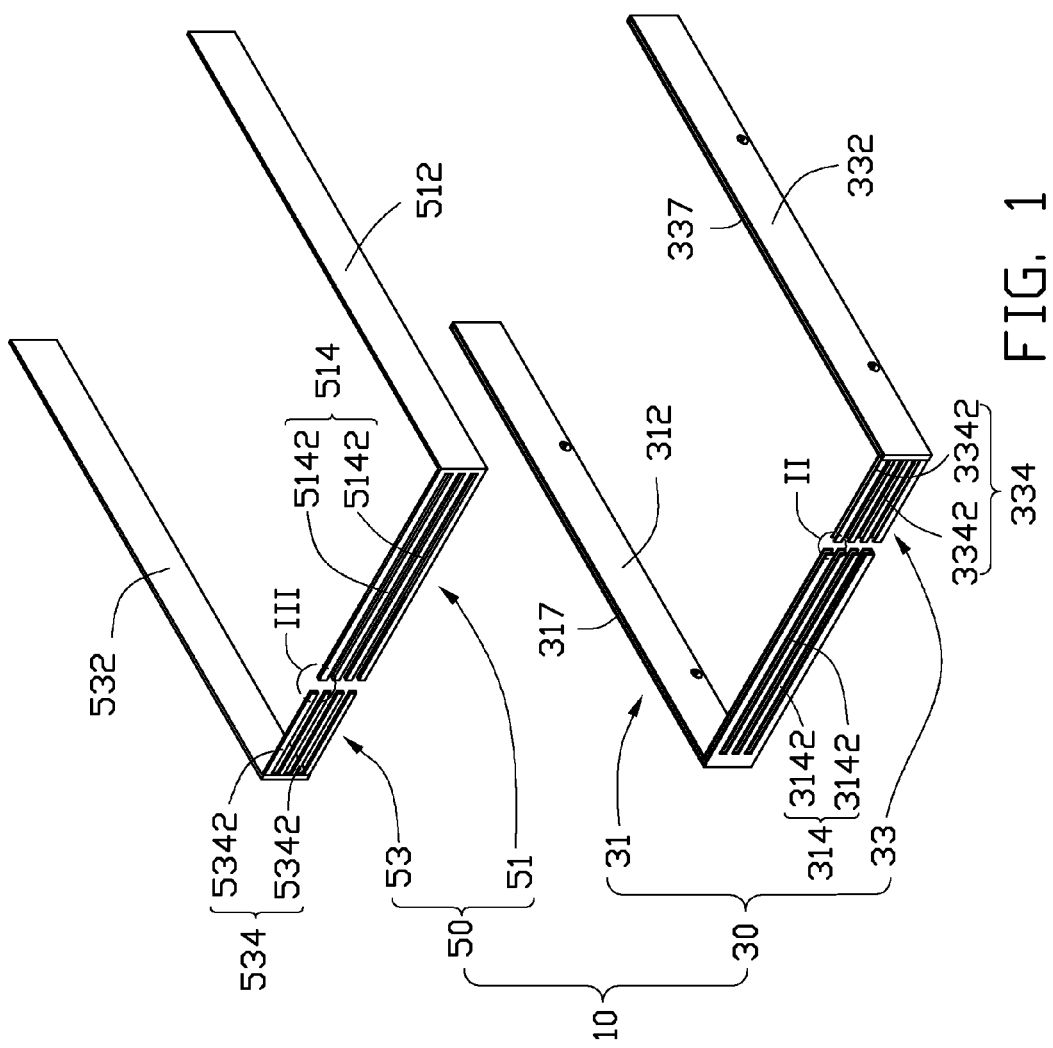
FIG. 1 is an exploded, isometric view of one embodiment of a carrier.

Referring to FIG. 1, one embodiment of a carrier 10 includes a main bracket 30 and an extension bracket 50 received in the main bracket 30.

Figure 2:
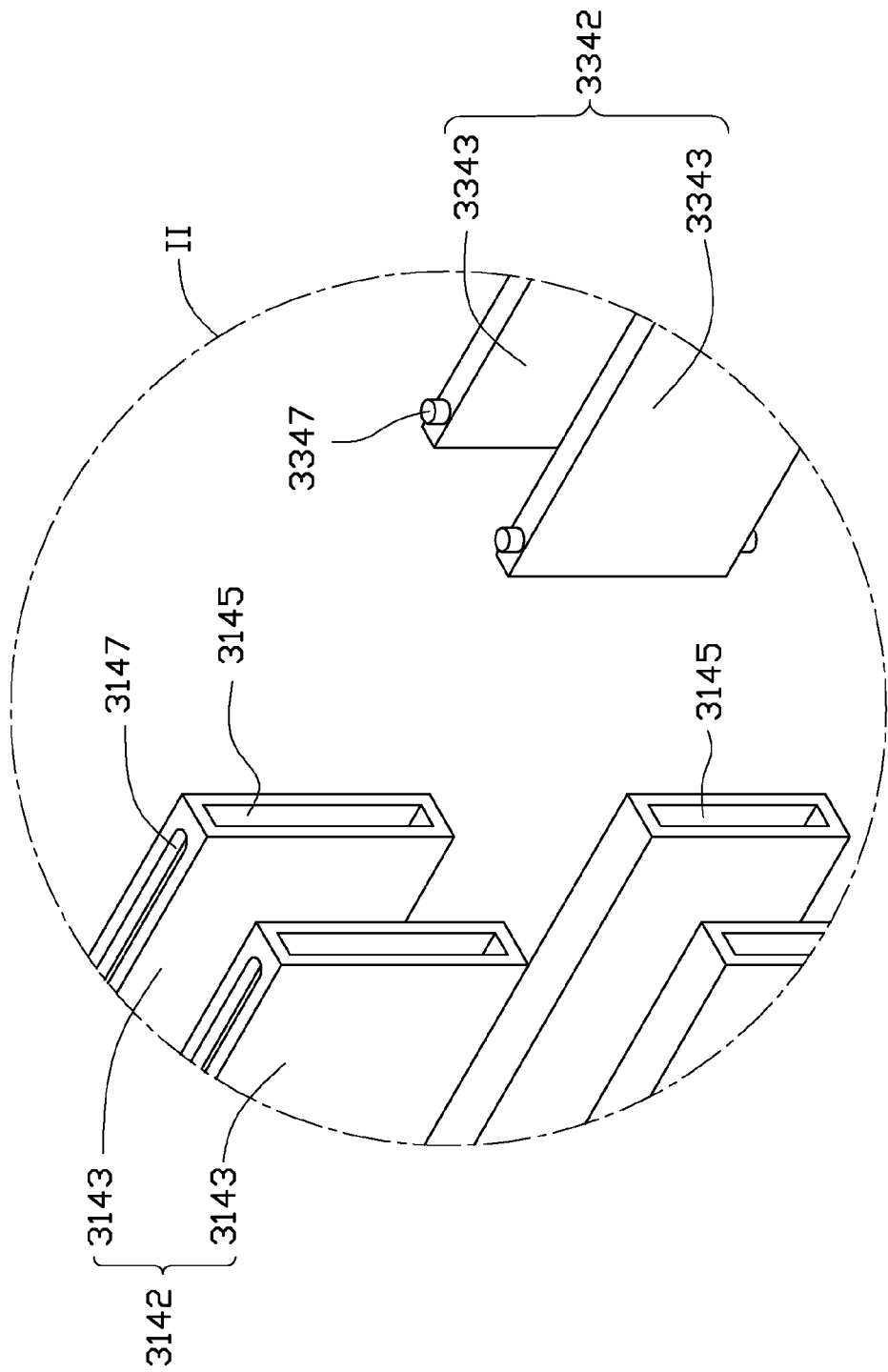
FIG. 2 is an enlarged view of a circled portion II of FIG. 1.

Referring to FIG. 2, the main bracket 30 includes a first mounting member 31 and a second mounting member 33. Both the first mounting member 31 and the second mounting member 33 are L-shaped. The first mounting member 31 includes a first front wall 314 and a first sidewall 312. The first front wall 314 is perpendicular to the first sidewall 312. The second mounting member 33 includes a second front wall 334 and a second sidewall 332. The second front wall 334 is perpendicular to the second sidewall 332. The first front wall 314 is telescopically extensible relative to the second front wall 334. The first front wall 314 includes a plurality of spaced and parallel first arms 3142. Each first arm 3142 includes two spaced first sub-arms 3143. The second front wall 334 includes a plurality of second arms 3342. Each second arm 3342 includes two spaced second sub-arms 3343. Each first sub-arm 3143 defines a first sliding channel 3145 for receiving the corresponding second sub-arm 3343. The first sliding channels 3145 are rectangular in cross section. A guiding slot 3147 is defined in at least one of the first sub-arms 3142 connecting to the corresponding first channel 3145. A guiding tab 3347 is formed on each second sub-arm 3343 corresponding to the guiding slots 3147. The first mounting member 31 defines a first receiving groove 317. The second mounting member 33 defines a second receiving groove 337. A length of the first front wall 314 is longer than the second front wall 334.

Figure 3:
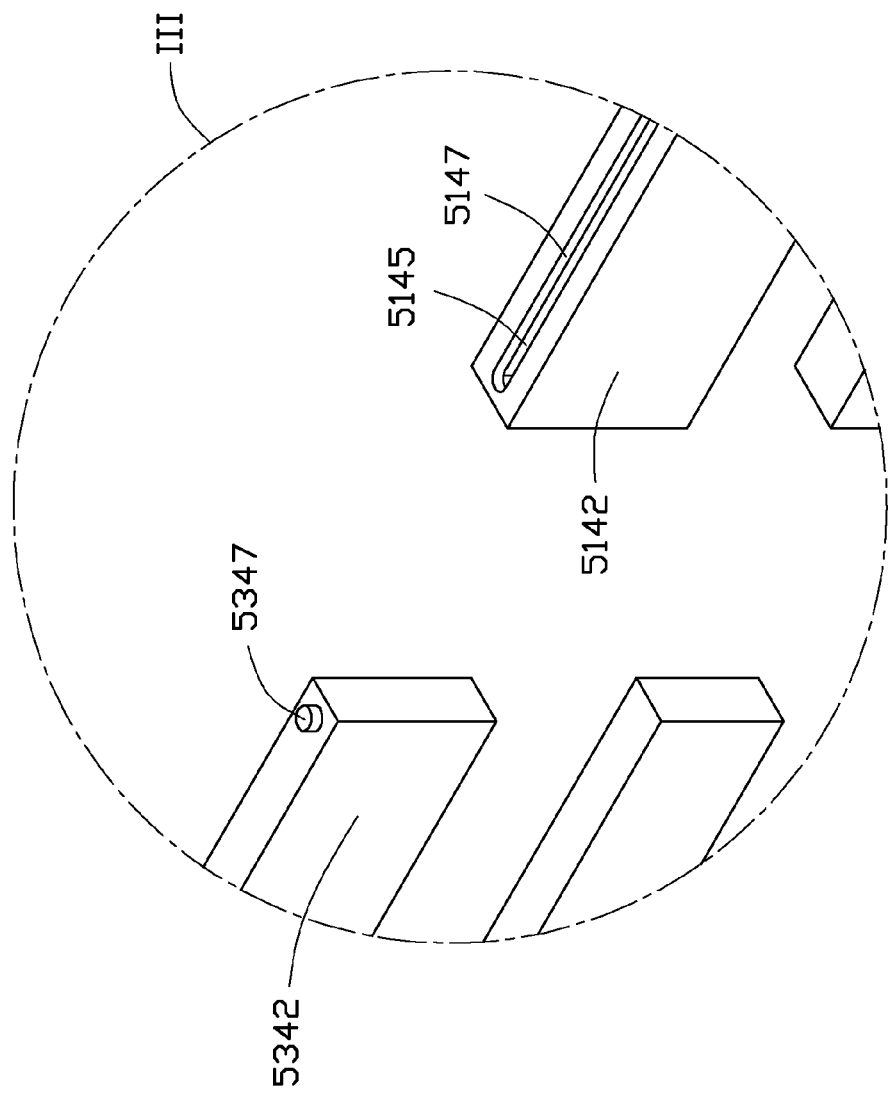
FIG. 3 is an enlarged view of a circled portion III of FIG. 1.

Referring to FIG. 3, the extension bracket 50 includes a third mounting member 51 and a fourth mounting member 53. The third mounting member 51 includes a third front wall 514 and a third sidewall 512 perpendicular to the third front wall 514. The fourth mounting member 53 includes a fourth front wall 534 and a fourth sidewall 532 perpendicular to the fourth front wall 534. The third front wall 514 includes a plurality of spaced and parallel third arms 5142. The fourth front wall 534 includes a plurality of fourth arms 5342. At least one of the third arms 5142 defines a third sliding channel 5145 for receiving the corresponding fourth arm 5342 and a third guiding slot 5147 connecting to the sliding channel 5145. A tab 5347 is defined in the fourth arm 5347 corresponding to the guiding slot 5147. A length of the third front wall 514 is longer than the second front wall 334.

When assembling the carrier 10, the first mounting member 31 is telescopically mounted to the second mounting member 33. The third mounting member 51 is telescopically mounted to the fourth mounting member 53. The extension bracket 50 is telescopically received in the main bracket 30.

Figure 4:
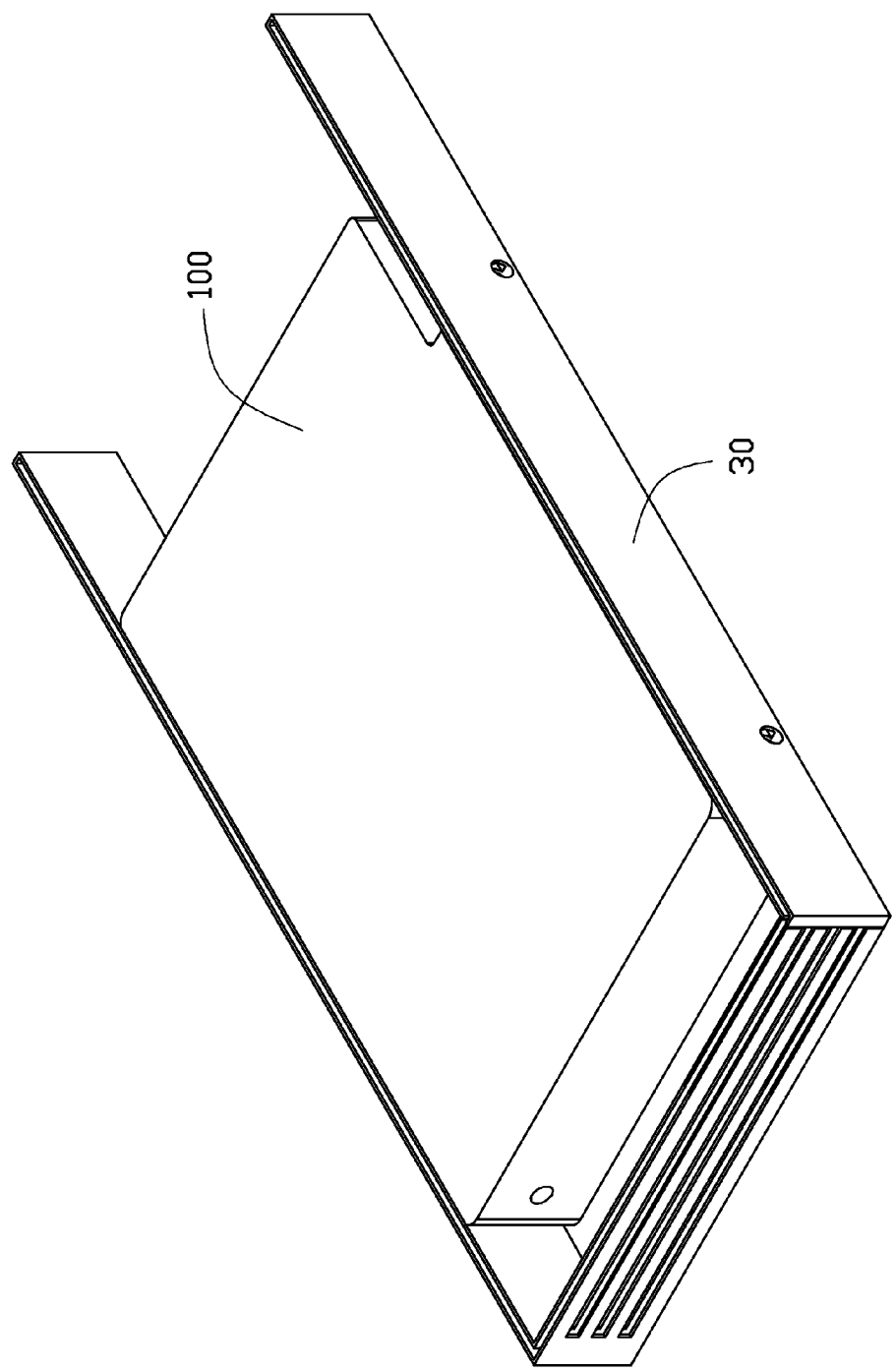
FIG. 4 is an assembled view of the carrier securing a first data storage device.

Referring to FIG. 4, when securing a first data storage device 100 (e.g., a hard disk drive), the first front wall 314 can telescopically extend relative to the second front wall 334 to adjust a retaining width between the first sidewall 312 and the second sidewall 332 in order to couple to the first data storage device 100. In the embodiment, the first data storage device 100 has substantially the same height as the main bracket 30. So only the main bracket 30 need be used for mounting the first data storage device 100.

Figure 5:
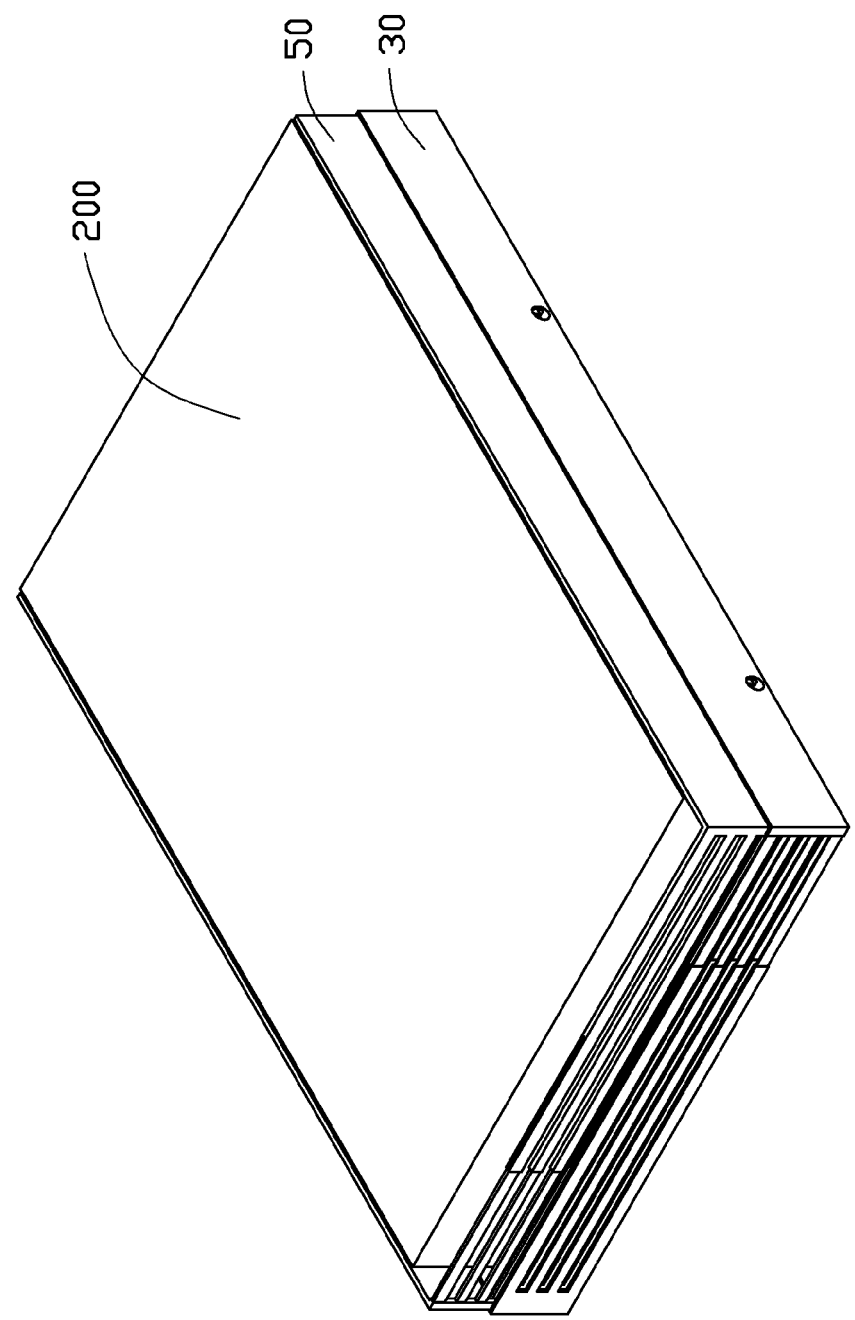
FIG. 5 is similar to FIG. 4, but shows the carrier securing a second data storage device.

Referring to FIG. 5, when securing a second data storage device 200 that is larger in size than the first data storage device 100. The first front wall 314 and the third front wall 514 can telescopically extend relative to the second front wall 334 and the fourth front wall 534 to adjust the retaining width in order to couple to the second data storage device 200. The extension bracket 50 can telescopically extend from the main bracket 30 to couple to the second data storage device 200.

In the embodiments, the carrier 10 can be coupled to various size data storage devices by adjusting the main bracket 30 and the extension bracket 50.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A carrier, comprising:
   a main bracket comprising:
      a first mounting member comprising a first sidewall and a first front wall, the first front wall comprising two parallel first arms, and each of the two parallel first arms comprising a pair of parallel first sub-arms;
      a second mounting member comprising a second sidewall and a second front wall, the second front wall comprising two parallel second arms, and each of the two second arms comprising a pair of parallel second sub-arms; and an extension bracket telescopically received in the main bracket between the pair of parallel first sub-arms and the pair of parallel second sub-arms;

wherein the first front wall is telescopically extensible relative to the second front wall along a first direction to adjust a retaining width between the first sidewall and the second sidewall in order to couple to various size data storage devices.

2. The carrier of claim 1, wherein the first arms define the first sliding channels, the first sliding channels are rectangular in cross section, and the second arms are received in the first sliding channels.

3. The carrier of the claim 2, wherein the first guiding slots are defined in the first arms connecting to the first sliding channels, and the guiding tabs are formed on the second arms corresponding to the first guiding slots.

4. The carrier of claim 1, wherein the first front wall is perpendicular to the first sidewall, the second front wall is perpendicular to the second sidewall, and both the first mounting member and the second mounting member are L-shaped.

5. The carrier of claim 1, wherein the extension bracket is telescopically received in the main bracket along a second direction, the second direction is perpendicular to the first direction.

6. The carrier of claim 5, wherein the extension bracket comprises a third mounting member and a fourth mounting member, the third mounting member comprises a third front wall and a third sidewall, the fourth mounting member comprises a fourth front wall and a fourth sidewall, the third sidewall is received in the second wall, the fourth sidewall is received in the first sidewall, and the third front wall and the fourth front wall are received in the second front wall and the first front wall, respectively.

7. The carrier of claim 6, wherein the third front wall and the fourth front wall are telescopically mounted.

8. The carrier of claim 7, wherein the first front wall is longer in length than the second front wall, and the third front wall is longer in length than the fourth front wall.

9. A carrier comprising:
a main bracket comprising:
a first mounting member comprising a first front wall and a first sidewall; and
a second mounting member comprising a second front wall and a second sidewall, and the second front wall telescopically extensible relative to the first front wall; and
an extension bracket telescopically received in the main bracket, the extension bracket comprising:
a third mounting member, the third mounting member comprising a third front wall and a third sidewall, the third sidewall being received in the second sidewall, and
a fourth mounting member, the fourth mounting member comprises a fourth front wall and a fourth sidewall, the fourth sidewall being received in the first sidewall;

wherein the first mounting member is telescopically extensible relative to the second mounting member and the extension bracket is telescopically extensible relative to the main bracket in order to couple to various size data storage devices, a length of the first front wall is longer than a length of the second front wall, and a length of the third front wall is longer than a length of the forth front wall.

10. The carrier of claim 9, wherein the first front wall comprises at least one first arm, the second front wall comprises at least one second arm, and the second arm is telescopically received in the first arm.

11. The carrier of claim 10, wherein the first arm defines a first sliding channel, the first sliding channel is rectangular in cross section, and the second arm receives in the first sliding channel.

12. The carrier of claim 11, wherein a guiding slot is defined in the first arm connecting to the first channel, and a guiding tab is formed on the second arm corresponding to the guiding slot.

13. The carrier of claim 9, wherein the first front wall comprises at least two parallel arms, and a space is defined between every two adjacent arms.

14. The carrier of claim 9, wherein the first front wall is perpendicular to the first sidewall, the second front wall is perpendicular to the second sidewall, and both the first mounting member and the second mounting member are L-shaped.

15. The carrier of claim 9, wherein the third front wall and the fourth front wall are telescopically mounted.

16. The carrier of claim 6, wherein a length of the first front wall is longer than a length of the second front wall, and a length of the third front wall is longer than a length of the forth front wall.

17. The carrier of claim 10, wherein the first arm comprises a pair of parallel first sub-arms, the second arm comprises a pair of parallel second sub-arms, the extension bracket is telescopically received in the main bracket between the pair of parallel first sub-arms and the pair of parallel second sub-arms.

* * * * *